(No Model.)
W. E. SIBLEY.
PENCIL SHARPENER.
No. 291,235. Patented Jan. 1, 1884.
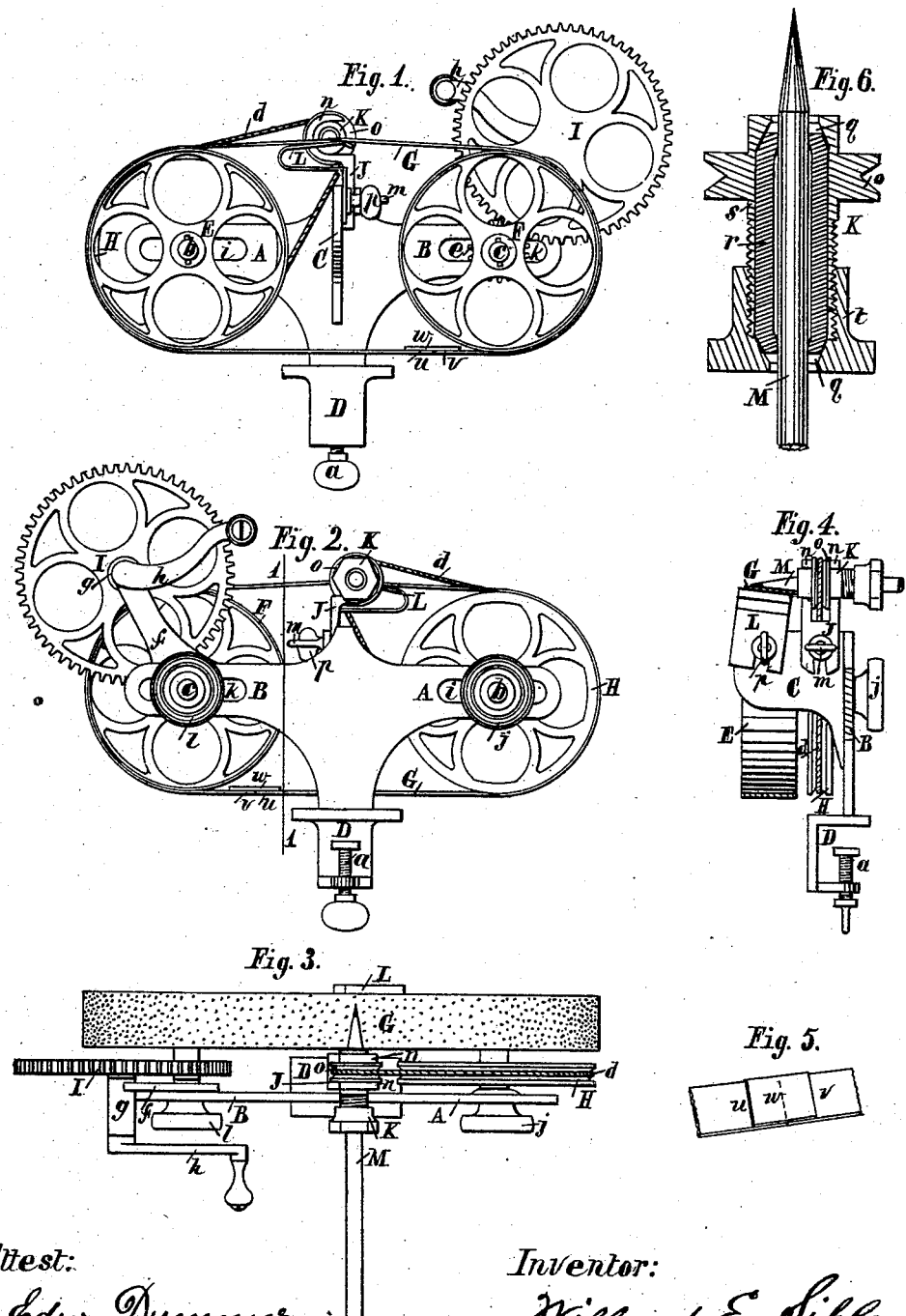
Attest:
Edw. Dummer,
S. M. Dummer.
Inventor:
Willard E. Sibley

UNITED STATES PATENT OFFICE.

WILLARD E. SIBLEY, OF WESTON, MASSACHUSETTS.

PENCIL-SHARPENER.

SPECIFICATION forming part of Letters Patent No. 291,255, dated January 1, 1884.

Application filed August 1, 1883. (No model.)

*To all whom it may concern:*

Be it known that I, WILLARD E. SIBLEY, a citizen of the United States, residing at Weston, in the county of Middlesex and State of Massachusetts, have invented a new and useful Pencil-Sharpener, of which the following is a specification, reference being had to the accompanying drawings.

My invention relates to a device for sharpening pencils; and it consists in the construction, arrangement, and combination of the several parts of the mechanism, as hereinafter set forth, and specifically pointed out in the claims.

In the drawings, Figure 1 is a front view, Fig. 2 a rear view, and Fig. 3 a plan, of a device embodying my invention. Fig. 4 is a section taken on line 1 1 in Fig. 2, showing parts on the right of said line. Fig. 5 shows part of a strip to form the cutting or rasping belt, illustrating the mode of connecting the ends of the same. Fig. 6 shows a section of the pencil-holder, drawn on a larger scale.

The frame of the machine has two arms, A and B, in line with each other, and an arm, C, at right angles thereto. The frame has connected therewith a clamp, D, having a thumb-screw, $a$, for fastening the device on a table or like support.

There are two pulleys, one, E, to revolve on a stud, $b$, and the other, F, to revolve on a stud, $c$. About these pulleys a band, G, extends, being of proper width and having its outer surface covered with suitable material—as sand—whereby, by cutting or rasping, it may give the required point to a pencil. Connected rigidly with the pulley E or with the hub thereof is a pulley, H, adapted for a belt, $d$. Connected with the pulley F, or joined to the hub thereof, is a pinion, $e$. Firmly connected to the stud $c$ is an arm, $f$, bearing a gear, I, which engages with the pinion $e$ and is fixed to a shaft, which may revolve in a bearing, $g$, fixed to the arm $f$. To the other end of this shaft is joined a crank, $h$. The stud $b$ is adapted to be moved along a slot, $i$, in the arm A and to be fastened at any desired place therein, by means of a thumb-piece, $j$, which screws on the stud at the back of the arm, to clamp the stud thereon. The stud $c$ may in a similar manner be moved along a slot, $k$, in the arm B and be clamped to the arm by means of a thumb-nut, $l$. By means of such adjustment the required tension may be given to the band G and the belt $d$.

In the side of the arm C is secured a stand, J, by means of a thumb-screw, $m$, and adapted so that it may be raised or lowered and be inclined, as desired. The upper end of the stand J has bearings $n$, wherein the pencil-holder K may revolve, and is formed to receive between the bearings $n$ a pulley, $o$, fixed on the pencil-holder. This stand is of the hook shape shown, whereby the pencil-holder may be inserted in the bearings $n$ from one side of the stand. The pencil-holder is retained in the bearings by the belt $d$, which passes around the pulley $o$ and the pulley H.

A plate, L, is secured to the arm C by means of a thumb-screw, $p$, in such a manner that it may be raised or lowered or inclined at any angle and firmly held in the required position. This plate is formed so as to have considerable elasticity and to press against the under surface of the band G, immediately under the pencil.

The pencil-holder K is hollow, having a cavity therein and openings at the ends of less diameter than said cavity. There are shoulders $q$, made tapering, as shown, at the ends of this cavity. In this cavity is a tube, $r$, of rubber or of material having like elasticity. By pressing the shoulders $q$ against the ends of the rubber tube the central opening in the latter may be contracted. This I prefer to do by making the pencil-holder of two parts, $s$ and $t$, and screwing one part on the other, as shown. Thus the central opening in the rubber tube is adjusted to pencils of any size and the pencil-holder adapted to firmly hold the pencil.

In operation, a pencil, M, is thrust in the holder, so that the end to be pointed is suitably over the band G, as shown. The plate L is properly raised, inclined, and secured, and, if need be, the stand J inclined, so that the band will be caused to press against the pencil in such a manner as to give the desired taper thereto. On revolving the gear I, by means of the crank $h$, the pinion $e$ and pulley F are revolved, giving motion to the band G, and consequently causing the pulley E and the pulley H to revolve. By means of the pulley H and belt $d$, the pulley $o$ and pencil-holder K and pencil M are also revolved. Thus the material of the pencil is quickly cut away by the rasping action of the band till the pencil is sharpened, a true and even taper being given to the end thereof. Pencils of any material—lead or slate—may be sharpened by this machine neatly and with dispatch.

It is desirable that the ends of the piece to form the band G should be so joined as to leave no ridge on its outer surface. For this purpose the ends $u$ and $v$ are butted together, and a binding and re-enforcing piece, $w$, pasted or glued on the interior surface of the band, over the place of juncture of said ends. The piece $w$ may be of any desired length, extending the length of the band, if desired to so strengthen the band.

I claim as my invention—

1. In a device for sharpening pencils, the combination of two pulleys, and a cutting or rasping band extending about the pulleys, with a pencil-holder located in such position as to hold the pencil against some part of the band between the pulleys, substantially as set forth.

2. In a pencil-sharpener, a pencil-holder having a cavity and a rubber or other elastic tube in said cavity, in combination with means for compressing said tube, substantially as set forth.

3. In combination with two pulleys and a cutting or rasping band extending around said pulleys, a plate, L, adapted to be adjusted, inclined, and secured in relation to the band, substantially as and for the purpose set forth.

4. In a pencil-sharpener, the combination of two pulleys, a cutting or rasping band about the pulleys, a pencil-holder, and means for adjusting said pulleys, whereby the required tension may be given to said band, substantially as set forth.

5. In a pencil-sharpener, a pencil-holder adapted to revolve in bearings, and having a pulley joined thereto, in combination with a driving belt and pulley, the latter pulley being adjustable to give the required tension to the belt, substantially as specified.

6. The combination, in a pencil-holder for a pencil-sharpening device, of parts $s$ and $t$, one to screw on the other, and having a cavity and tapering shoulders, $q$, therein, with a tube, $r$, of rubber or of like elastic material, in said cavity, substantially as and for the purpose set forth.

7. In a pencil-sharpener, the combination of pulleys E and F, band G, and adjustable studs $b$ and $c$, substantially as specified.

8. The combination of pulleys E and F, band G, and revolving pencil-holder K, substantially as specified.

9. The combination of pulleys E and F, band G, and plate L, elastic and adjustable, substantially as specified.

10. The combination of two pulleys, E and F, band G, elastic and adjustable plate L, and revolving pencil-holder K, substantially as set forth.

11. In a pencil-sharpener, a cutting or rasping band, the ends of the piece forming the same being butted together and held by means of a binding or re-enforcing piece on the inner surface of the band over the place of juncture of said ends, in combination with a pencil-holder located in such relation to said band that the pencil is held transverse to the band, substantially as and for the purpose set forth.

WILLARD E. SIBLEY.

Witnesses:
EDW. DUMMER,
S. M. DUMMER.